United States Patent [19]

Bowman

[11] Patent Number: 5,530,810
[45] Date of Patent: Jun. 25, 1996

[54] APPARATUS FOR LIVE BUS INSERTION OF ADD-ON DEVICES

[75] Inventor: Michael H. Bowman, Palo Alto, Calif.

[73] Assignee: 3Com Corporation, Santa Clara, Calif.

[21] Appl. No.: 473,203

[22] Filed: Jun. 7, 1995

Related U.S. Application Data

[62] Division of Ser. No. 24,189, Feb. 26, 1993.

[51] Int. Cl.⁶ .................. G06F 13/00; H01R 13/02; H01R 13/642
[52] U.S. Cl. .................. 395/283; 395/281; 361/791; 439/374; 364/929.4; 364/927.93; 364/DIG. 2
[58] Field of Search .................. 395/283, 750, 395/281; 307/43, 147, 150; 364/514 B; 365/203, 226; 361/788, 58, 803, 791; 439/374

[56] References Cited

U.S. PATENT DOCUMENTS

| | | | |
|---|---|---|---|
| 4,079,440 | 3/1978 | Ohnuma et al. | 361/816 |
| 4,379,344 | 4/1983 | Ozawa et al. | 365/203 |
| 4,510,553 | 4/1985 | Faultersack | 361/788 |
| 4,574,332 | 3/1986 | Calabro | 361/791 |
| 4,579,406 | 4/1986 | Laursen et al. | 439/62 |
| 4,609,829 | 9/1986 | Milby et al. | 307/150 |
| 4,835,737 | 5/1987 | Herrig et al. | 395/283 |
| 4,897,055 | 1/1990 | Jurista et al. | 439/699.1 |
| 4,918,329 | 4/1990 | Milby et al. | 326/86 |
| 4,999,787 | 3/1991 | McNally et al. | 364/514 B |
| 5,028,809 | 7/1991 | Watanabe et al. | 307/137 |
| 5,157,771 | 10/1992 | Losi et al. | 395/283 |
| 5,210,855 | 5/1993 | Bartol | 395/500 |
| 5,268,592 | 12/1993 | Bellamy et al. | 307/43 |
| 5,272,584 | 12/1993 | Austruy et al. | 361/58 |
| 5,317,697 | 5/1994 | Husak et al. | 395/283 |
| 5,384,492 | 1/1995 | Carlson et al. | 307/147 |
| 5,432,916 | 7/1995 | Hahn et al. | 395/283 |

*Primary Examiner*—Gopal C. Ray
*Attorney, Agent, or Firm*—Haynes & Davis

[57] ABSTRACT

An apparatus for allowing an add-on device to be inserted onto an active bus and configurable within one bus cycle is provided. The apparatus includes passive circuits used with a sequential multi-length pin arrangement on an I/O module. The apparatus also decouples the source of power to the I/O module from other devices on the bus which limits the disruption of power during the insertion. The I/O module limits current drawn from a backplane containing the bus which may disrupt signals during the insertion of the add-on device. And finally, the I/O module also limits bus signal disruption during insertion by precharging signal pins, increasing the resistance between the add-on I/O module pins and the backplane and adding capacitance to the bus.

27 Claims, 13 Drawing Sheets

FIG.5a — J1 (60)

| | | | | | | | | | | | | |
|---|---|---|---|---|---|---|---|---|---|---|---|---|
| D | CBAD0 | CBAD3 | CBAD5 | CBAD7 | CBAD9 | GND 5.0mm | HWRES 5.0mm | APRDY | CONFIG | RWSTAT0 | CBAD11 | CBAD13 |
| C | CBAD1 | GND | CBAD6 | CBAD8 | BCDP0 | +5 | BCDP2 | LOCK | GND | NC | CBAD12 | CBAD14 |
| B | CBAD2 | CBAD4 | Error | CBAD10 | -12 | BCDP1 | Breq | Gnd | STAT1 | BUSY | +5 | Gnd |
| A | GND | +5 | GND | +5 | Gnd | +5 6.5mm | +12 6.5mm | +5 | Gnd | +5 | GND | Clkin |
| pin | A1 | A2 | A3 | A4 | A5 | A6 | A7 | A8 | A9 | A10 | A11 | A12 |

FIG.5b — J2 (60)

| S+5-1 8.0mm D1-D3 | SGND 8.0mm D4-D6 | D7 |
|---|---|---|
| S+12 7.25mm C1-C3 | S+5-2 7.25mm C4-C6 | |
| SGnd 7.25mm B1-B3 | S-12V 7.25mm B4-B6 | |
| GND 6.5mm A1-A3 | +5 6.5mm A4-A6 | |

FIG.5c — J3 (60)

| | | | | | | | | | | | | |
|---|---|---|---|---|---|---|---|---|---|---|---|---|
| D | CBAD15 | CBAD17 | CBAD19 | CBAD21 | CBAD23 | Earlyw 5.0mm | D7 GND 5.0mm | CBAD27 | CBAD29 | NC | FDDI2 | FDDI5 |
| C | CBAD16 | CBAD18 | GND | CBAD22 | GND | CBAD26 | CBAD28 | CBAD30 | +5 | +5 | FDDI3 | FDDI6 |
| B | GND | GND | CBAD20 | CBAD24 | +12 | CBAD25 | Gnd | CBAD31 | GND | GND | FDDI4 | FDDI7 |
| A | Clkout | +5 | GND | +5 | GND | +5 6.5mm | -12 6.5mm | +5 | GND | +5 | GND | +5 |
| pin | A1 | A2 | A3 | A4 | A5 | A6 | A7 | A8 | A9 | A10 | A11 | A12 |

APPARATUS FOR LIVE BUS INSERTION OF ADD-ON DEVICES

This application is a divisional of application Ser. No. 08/024,189, filed Feb. 26, 1993.

CROSS-REFERENCE TO RELATED APPLICATIONS

The present application is related to copending U.S. patent application entitled "System Architecture For Managing Large Amounts Of I/O And Network Interface Processor Using The Same," Ser. No. 08/023,927, filed Feb. 26, 1993, now pending, which is owned at the time of the invention as currently owned by the same assignee.

BACKGROUND OF THE INVENTION

1. Field of the Invention

The present invention relates to bus architectures, and in particular, the interface between a bus actively transferring information and an add-on device inserted onto the bus.

2. Description of Related Art

The transfer of I/O data between devices in a computer system or between networks is typically carried out by a "local" or "network" bus, respectively. In many instances, a processor or bus controller controls the flow of information between devices. Each device on the bus may generate electrical signals representing address, data or interrupt information to the bus controller or other devices. These electrical signals on the bus are generated during time intervals or bus cycles synchronized by a bus clock. The number of bus cycles or transfers per second is used to classify the speed of a bus. For example, prior art busses may transfer information anywhere from 8 MHz to 25 MHz or higher. In a "network" bus, devices on the bus may be network interface devices which allow networks to transfer I/O data using an internetwork device such as a bridge, router or gateway.

When a device is added to a bus which is actively transferring information, the bus must accommodate the add-on device's consumption of power upon power up and introduction into the bus's active signal path. Typically, a bus is coupled to a backplane which is used to distribute power and connect devices to the bus. When a device, such as a circuit card, is inserted into the backplane, the insertion causes a surge of power consumption as the uncharged capacitances associated with the circuit card is shorted across the power supply. This power surge then affects the power supply to other devices on the backplane. Similar problems arise when the device comes into contact with the bus's active signal path. Likewise, uncharged capacitances associated with the inserted circuit card may disrupt the active signals on the bus.

In the prior art, limiting power disruption and degradation of bus signals during the insertion of add-on devices has been achieved by using Field Effect Transistors (FETs) on the backplane. However, these active circuits increase the cost and complexity of the bus interface. The use of FET devices requiring full source rating to handle 12 V without breakdown is expensive. It also requires the use of a higher power supply voltage to compensate for the voltage drop across the FET. Finally, present bus architectures require several bus cycles before the add-on device is configured and the bus is able to once again initiate transferring I/O data on the bus. Prior art buses required that the bus to be shut-down while the add-on device was inserted and required several bus cycles before the bus is brought back up.

Accordingly, it is desirable to produce an apparatus which prevents power and signal disruption during the inserting of the device onto the bus without using active circuitry and multiple bus cycles before the bus is able to transfer information.

SUMMARY OF THE INVENTION

The present invention provides an apparatus which decouples the power supply to devices on the bus which reduces power surges during the insertion of the add-on device. In addition, the apparatus includes an input/output module having a plurality of pins at various lengths allowing for sequential mating of the device to the bus. This sequential mating allows for precharging of the device which reduces power consumption and limits bus signal disruption during insertion.

Thus, according to one aspect of the present invention, the apparatus includes a backplane for connecting the first device to the live bus. A first conductive path, coupled to a power supply and the backplane, supplies power to the first device and the second device. Passive interface means is provided for preventing a substantial reduction of the power to the second device during the inserting of the first device onto the backplane.

The passive interface means includes a second conductive path, coupled to the backplane and power supply, for supplying power to the first device having a capacitance, The first device includes a first and second pin extending from the device at a first and second length, respectively, allowing for the first pin to contact the second conductive path before the second pin contacts the first conductive path.

According to another aspect of the present invention, the live bus transfers information during a bus cycle and the first device transfers information on the live bus within a single bus cycle and after the inserting of the first device onto the backplane.

According to another aspect of the present invention, the apparatus includes means for substantially reducing the disruption of a signal on the live bus during the inserting of the first device onto the backplane allowing for the first device to transfer information during a single bus cycle. The means for substantially reducing the disruption of the signal on the bus includes means for precharging the address and data lines of the first device during the insertion of the first device onto the backplane.

According to yet another aspect of the present invention, the backplane and I/O module have a first and second trace impedance, respectively, and the means for substantially reducing the disruption of the signal on the bus includes the first trace impedance being substantially lower than the second trace impedance.

According to another aspect of the present invention, the apparatus includes a backplane for connecting the first device onto the live bus and a power supply coupled to the backplane for supplying power to the first device and the second device. Passive interface means is provided for preventing a substantial reduction of power to the second device during the inserting of the first device onto the backplane, as well as means for substantially reducing the disruption of the signal on the bus.

According to another aspect of the present invention, an apparatus for warning of the removal of a device connected to a live bus and coupled to a processor is provided. The apparatus includes a backplane connecting the device to the bus and a power supply coupled to the backplane for supplying power to the device. The warning pin prevents an active transfer on the bus as the add-on device is being removed. Finally, means for detecting the disconnection of the device from the backplane includes the processor generating a signal at a first level on the backplane and the device having a resistor, coupled to the backplane, in series with a ground potential which lowers the signal to a second level.

According to still another aspect of the present invention, an apparatus for inserting a network interface device onto an active communication bus which includes a plurality of network interface devices coupled to respective networks communicating packets of I/O data is provided. The apparatus includes a backplane for connecting a network interface device to the bus. A power supply is coupled to the backplane for supplying power to the network interface device and the plurality of network interface devices. Passive interface means for preventing a substantial reduction of power to the plurality of network interface devices and means for substantially reducing the disruption of a signal on the bus during the inserting of the network interface device onto the backplane is included.

In addition, a core memory and a processor, including local memory storing control information and routines involved in moving packets of I/O data among the plurality of network interface devices, is included. A bus memory interface, including means coupled to the bus and the core memory transfer packets of I/O data and control data used by the plurality of network interface devices between the bus and the core memory. Finally, a processor memory interface, including means coupled to the processor and the core memory transfer control data used by the plurality of network interface devices between the core memory and the processor is provided.

Other aspects and advantages of the present invention can be seen upon review of the figures, the detailed description, and the claims which follow.

BRIEF DESCRIPTION OF THE FIGURES

FIGS. 5a–5c represent connector pin layouts of the I/O module of FIG. 4 according to the present invention.

DETAILED DESCRIPTION OF THE FIGURES

Figure 1:
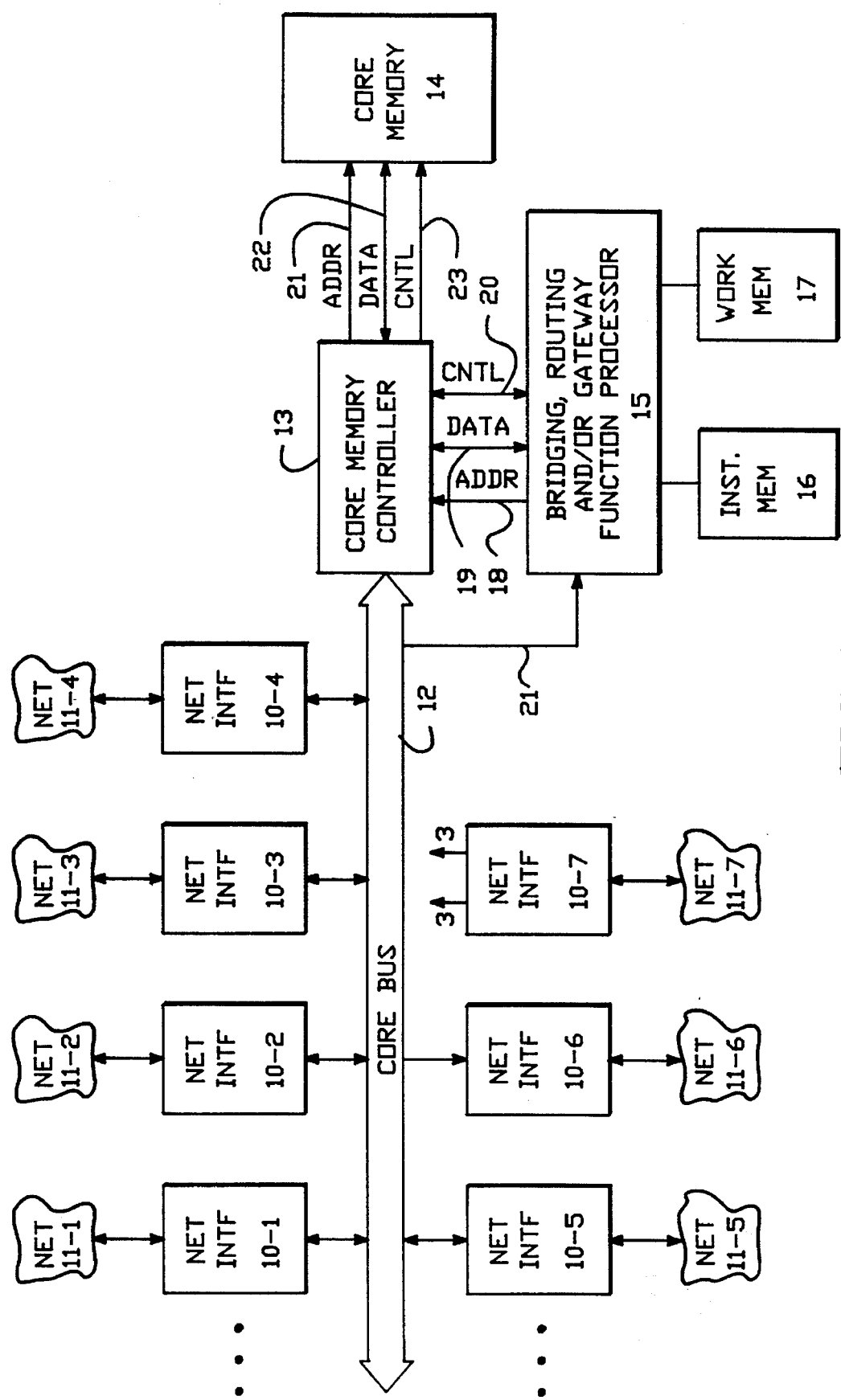
FIG. 1 is an overview block diagram of an internetworking system according to the present invention.
Figure 2:
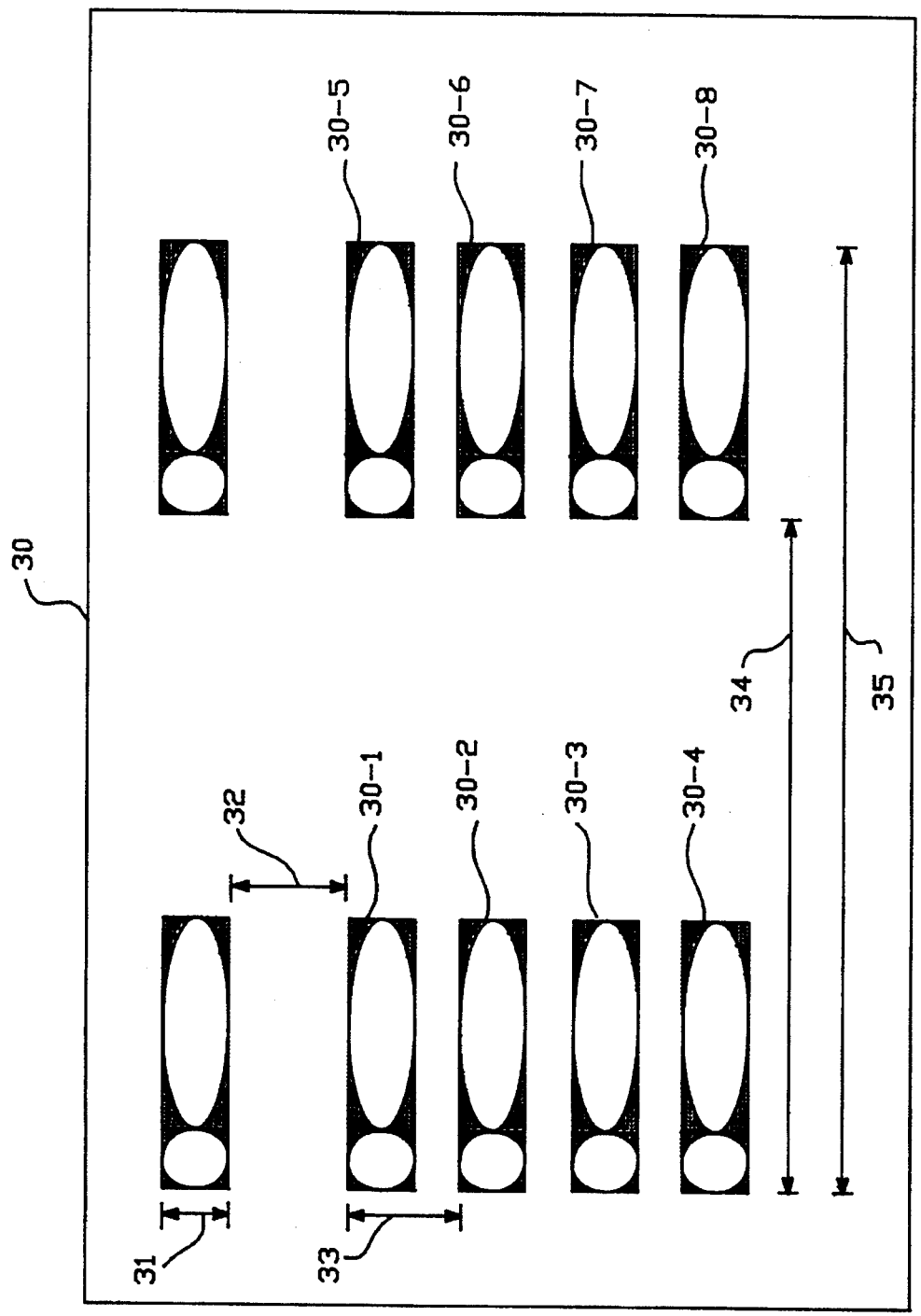
FIG. 2 is a backplane showing the mechanical dimensions and connections according to the present invention.
Figure 3:
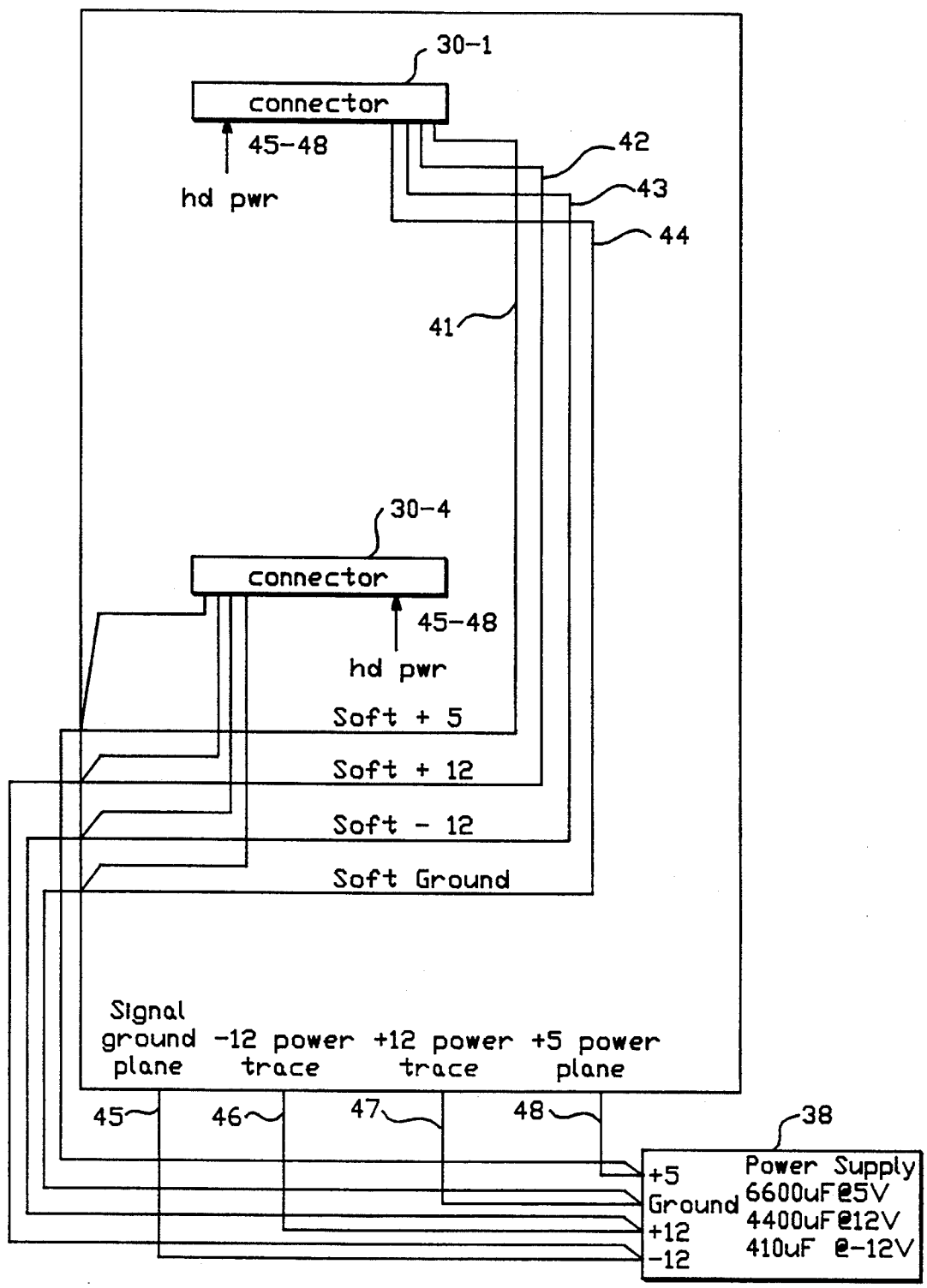
FIG. 3 illustrates the power distribution of the backplane of FIG. 2.
Figure 6:
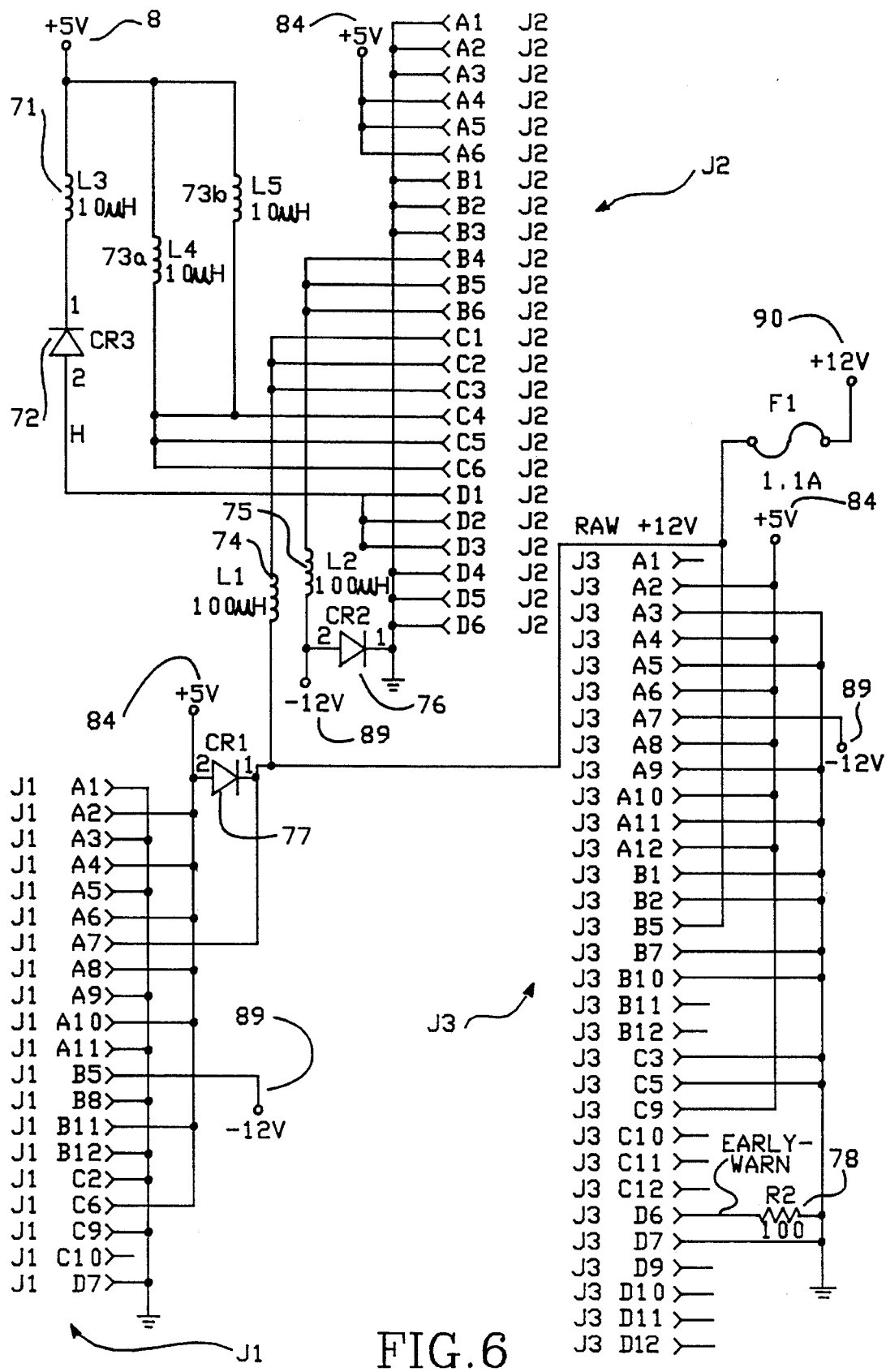
FIG. 6 is a schematic diagram of the soft start circuitry of the I/O module in FIG. 4 according to the present invention.
Figure 7:
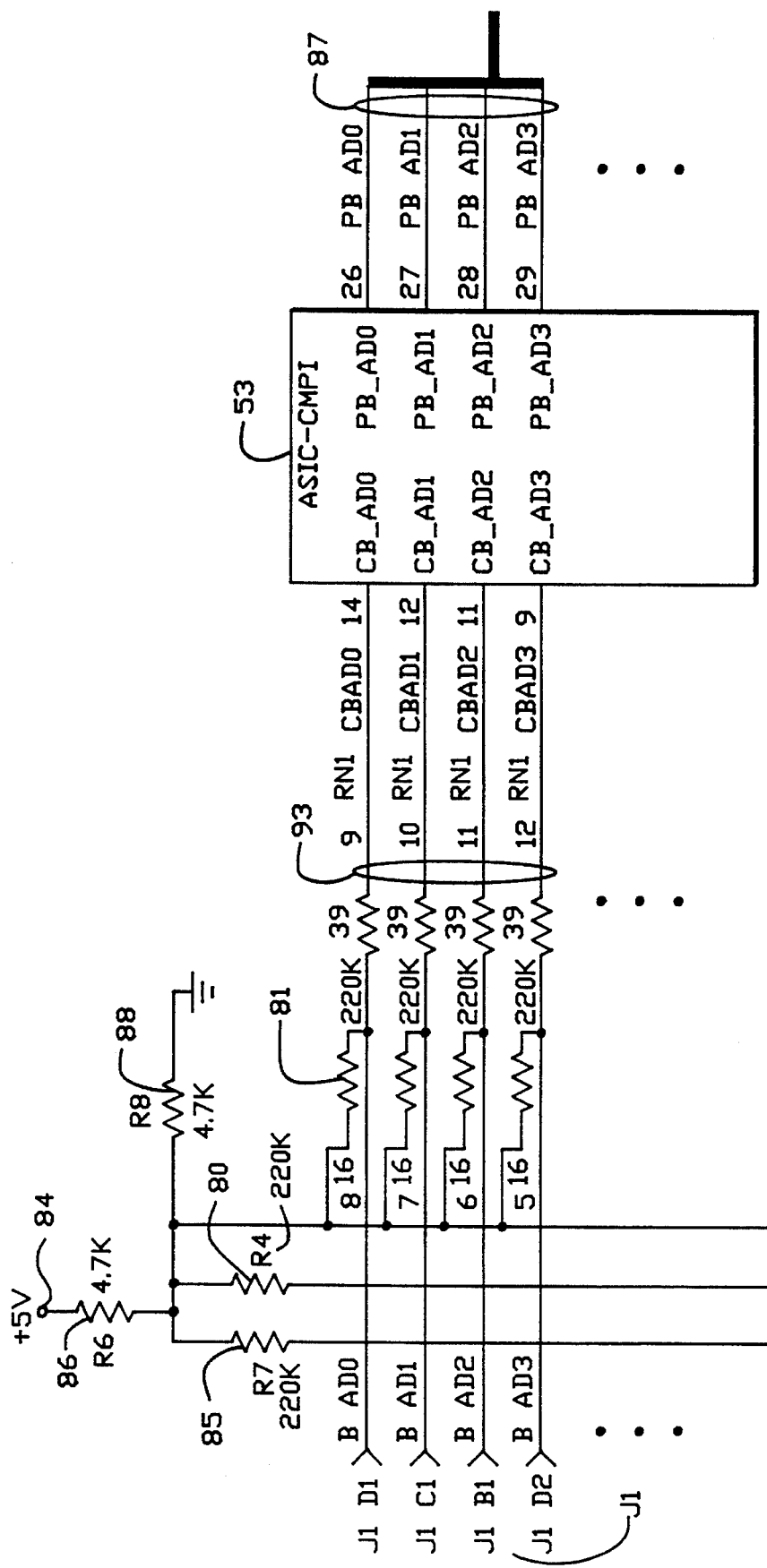
FIG. 7 is a schematic diagram of the precharging circuitry of the I/O module in FIG. 4 according to the present invention.

A detailed description of the preferred embodiments of the present invention is provided with respect to the figures. FIG. 1 provides an overview of an internetworking embodiment. FIGS. 2 and 3 illustrate a backplane configuration for a bus. FIGS. 4 and 5a–c illustrate an I/O module with a layout of I/O module pins. FIGS. 6–7 are schematics of I/O module circuitry. FIGS. 8, 9a–b and 10a–c illustrate signals on the bus during the insertion of the I/O module.

FIG. 1 illustrates the architecture of an internetwork system according to the present invention. The system includes a plurality of network interface devices labelled 10-1 through 10-6, that are coupled to respective networks 11-1 through 11-6. Each of the plurality of network interface devices 10-1 through 10-6 is coupled to an I/O bus 12. Network interface device 10-7 which is coupled to network 11-7 represents an add-on device inserted onto I/O bus 12. Arrows 3 represents the add-on interface between network interface 10-7 and I/O bus 12. The interface and insertion of network interface 10-7 and its affect on I/O bus 12 will be described in detail below.

The bus 12 is also connected to a core memory controller 13 through which access to a core memory 14 is provided. Also coupled to the core memory controller 13 is an internetwork function processor 15 having instruction memory 16 and working memory 17. Core bus 12 is also connected directly by line 21 to internetwork function processor 15. The internetwork function processor 15 supplies addresses on line 18, data on line 19, and control on line 20 to the core memory controller 13 for the purpose of reading and writing data in the core memory 14, and communicating with the network interface devices 10-1 through 10-7 across the bus 12.

Similarly, the core memory controller 13 is coupled to the core memory 14 across address lines 21, data lines 22, and control lines 23 for accesses by the internetwork function processor 15 and the plurality of network interface devices across the bus 12 to the core memory 14.

Each of the network interface devices coupled to the bus 12 includes a relatively intelligent processor which communicates across the bus 12 with buffers and control structures in the core memory 14, using configuration information in respective configuration stores 24-1 through 24-7 (not shown in Figure). The internetwork function processor 15 is responsible for setting up the configuration information in the configuration stores 24-1 through 24-7 by communicating across the bus 12.

Each network interface device has specific needs for buffers and control structures in order to carry out the network interface function. All of these buffers and control structures that are needed by the interface devices are kept in the core memory 14. All other data in the system is maintained by the instruction memory 16 and working memory 17 of the internetwork function processor 15.

Using this architecture, the internetwork function processor may perform internetworking routines using the instruction memory 16 and working memory 17 without suffering wait states due to contention with the network I/O transfers into and out of the core memory. Only when the internetworking routine requires control information from the control structures or control fields in the packets of network data, are accesses by the internetwork function processor necessary to the core memory 14.

FIG. 2 illustrates the physical layout of backplane 30 used to connect network interface devices 10-1 through 10-7 onto I/O bus 12 by connectors 30-1 through 30-8, respectively. An illustration of surface and buried traces are also shown in FIG. 3 which will be described in detail below. Backplane 30 is a six-layer backplane with three signal layers, one for each row of the connectors.

The thickness of backplane 30 is 93 mil and the traces on the backplane are 8 mil in width, one ounce finished copper to yield trace thickness of about 1 mil. The traces are spaced 9 mil off of a ground or power plane on the surface layers to yield a characteristic impedance of approximately 60 ohms and a capacitance of 28 pF per foot.

The inner layers are striplines, and should be centered with 18 mil distance off of power planes on either side. This yields similar impedance and capacitive characteristics to the surface traces. The traces should be routed so as to minimize the overall length of the bus.

The impedance-of the surface trace is calculated as:

$$Z0=(87/sqrt(Er+1.41)) *ln(5.98*h)/(0.8*w+t))$$

where:

Er is relative dielectric constant of FR4(4.7)

h is distance off a ground plane (0.009)

w is width of trace (0.008)

t is height of trace (0.0015 for 1 oz copper)

Z0=63 ohms for the dimensions given. This impedance is reduced by about 5 percent when the traces are not open to air, but are covered.

The impedance of buried traces is given by:

$$Z0=(60/sqrt(Sr))*ln (4b/(0.67*PI*w*(0.8+t/w)))$$

where:

Er is relative dielectric constant of FR4(4.7)

b is distance between two power planes surrounding the trace (0.036)

w is width of the trace (0.008)

t is the height of a trace (0.0015 for 1 oz copper)

Z0=60 ohms for the dimensions given.

These impedances are approximations. Signals in the same plane should not be closer than 25 mils to each other in order to keep signal crosstalk to a minimum. At 25 mils spacing, the crosstalk coefficients are kept to Kf (forward crosstalk coefficient) of 0.04 and Kb (backward crosstalk coefficient) of 0.09. This means, for example, that a trace 1 foot in length at the minimum separation with a 2 nSec. rise time should yield for crosstalk of 0.23 volts. The backward crosstalk should be approximately 0.20 volts.

The connectors 30-1 through 30-8 require 27 mil diameter drill holes, 58 mil diameter lands, and 65 mil diameter clearance through power and ground planes. Several signals will be treated specially on backplane 30. The clock signal should be isolated from other signals by ground traces on either side. In addition, the clock signal will be terminated on each end of the bus with a thevinin termination (not shown) consisting of 130 ohms from signal to ground and 110 ohms from signal to +5 volts. This gives an equivalent impedance of about 60 ohms and a DC bias point of about 2.7 volts. The impedance compensates for slightly worse drive characteristics of pullup transistors in a clock driver. Finally, Pins 58a–e represent the five levels or different lengths of pins used to connect module 50 to backplane 30.

The shared open drain signals should be terminated with a 3.3 uH inductor and 300 ohm resistor in series to 5 volts. This allows them to attain proper values within one clock period when pulled down and within one and one-half clock periods when released.

FIG. 3 illustrates the decoupling of the power supply between connectors 30-1 and 30-4. Power from power supply 38 provides power along "hard power" traces 45–48 to connectors 30-1 and 30-4 during operation of the network interface devices. "Soft power" traces 41–44 provide power to the network interface device during insertion allowing for precharging of the device. The insertion of the network interface device will be described in detail below.

Figure 4:
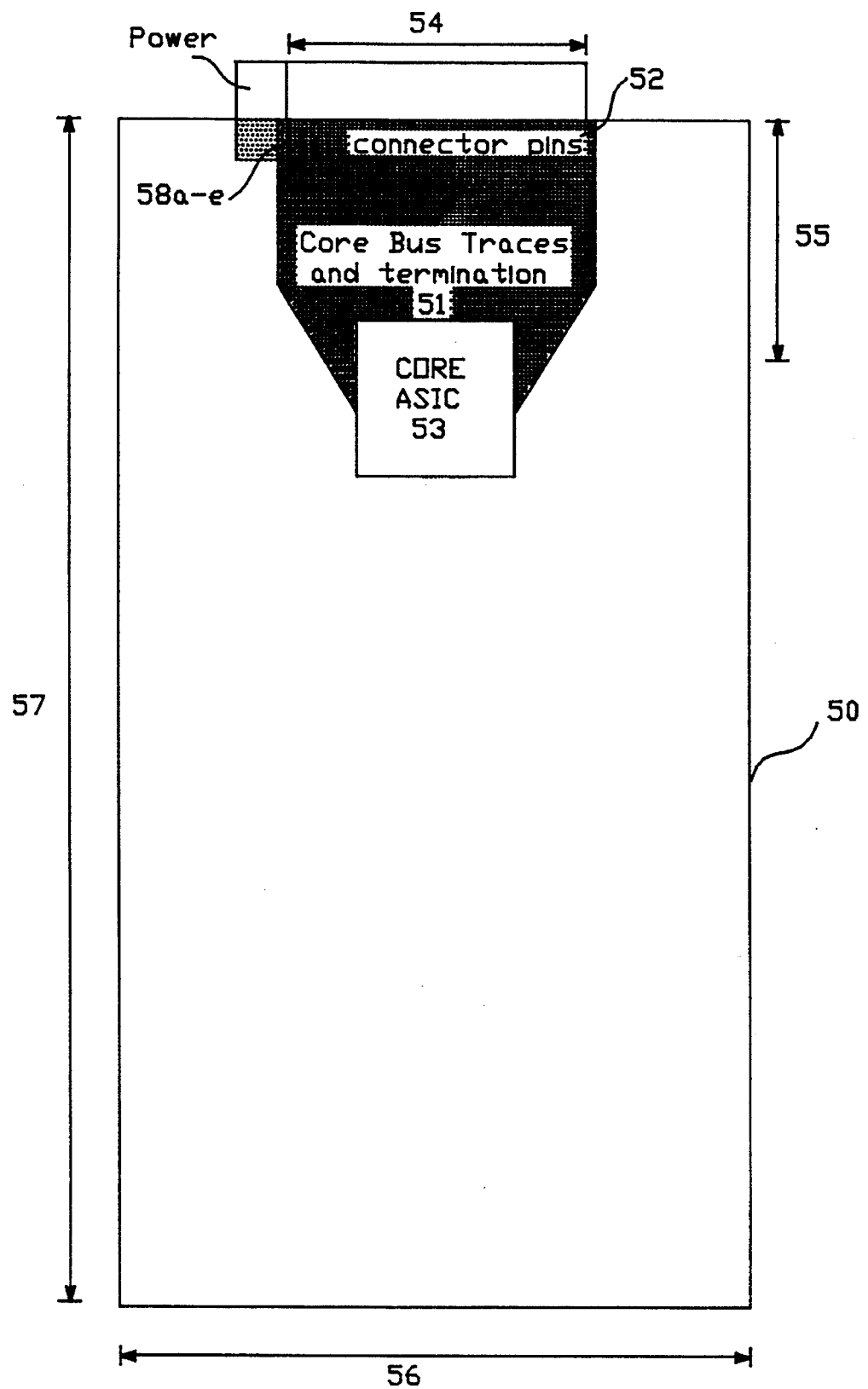
FIG. 4 shows the mechanical dimensions of an I/O module which may be inserted into the backplane of FIG. 2 according the present invention.

FIG. 4 shows the physical dimensions of I/O module 50 used in network interface 10-7 to couple to connectors 30-1 through 30-8 of backplane 30. The dimensions of I/O module 50 is given by distances 54 through 57 and are 1.9, 1.5, 3.9, and 8.7 inches, respectively. I/O module 50 has traces 51 with length 55 of not more than 2 inches between the I/O module connector 52 and Application Specific Integrated Circuit (ASIC) 53. Traces on I/O module 50 are 8 mil width, using 1 oz finished copper to yield a trace thickness of approximately 1 mil. Trace impedance is approximately 100 ohms with subsequent trace capacitance approximately 16 pF per foot. Traces 51 should be located as far from power or ground planes of I/O module 50 as possible to minimize capacitance and maximize impedance. As power and ground are usually buried layers, bus traces should be routed on the surface layers if possible. The clock line is the only exception. The clock trace should be routed on the layer closest to the ground plane to give an impedance close to 50 ohms and routed from bus 12 in as direct a manner as possible to ASIC 53. Moreover, the clock line should be placed on an ASIC pin as close to power and ground pins as possible.

FIGS. 5a–c represent connector pins 52 of FIG. 4 in a 96 pin metal connector layout. Each square, with squares in FIG. 5b represent three pins, represents pins with various lengths as labeled. Otherwise, unlabeled squares represent pins 5.75 mm in length. FIGS. 5a, b and c represent the left J1, middle J2, and right J3 connector pins, respectively. The top row of pins 60 closest to the PC board of I/O module 50 is used primarily to carry signals because this area has the least crosstalk. No ground pins are needed in top row 60 because the PC board ground acts as a ground return. The other rows are interspersed with 50 percent ground pins, to provide a shield against crosstalk. Crosstalk is approximately 0.2 volt with the layout indicated in FIGS. 5a–c.

As indicated in FIGS. 5a–c, the pins are of five different lengths allowing for sequential mating of selective pins during the inserting of I/O module 50 onto backplane 30. This multi-length pin configuration allows for the I/O module 50 to be precharged before signal pins come into contact with bus 12. This precharging, along with other design considerations, allows for the insertion of an add-on device, I/O module 50, onto a bus with minimal disruption to active signals on the bus and power surges to other devices on the bus.

The first level of mating is considered the soft ground or first soft start precharge of +5 volts. The second level is the second soft start of +5 volts and the soft start precharge of +12 and −12 volts. The third level is the direct applications of the +5, +12 and −12 volts of power. The fourth level of mating is the actual bus signals and ground. The fifth, and final level of mating, is the early disconnect warning level.

Pins D1–D6 on J2, which are at the 8 mm in length pin level, are used for the first soft start precharge. Each pin level is separated by 0.75 mm or a little less than 30 mil with pins D6 and D7 on J3 which are 5 mm in length used for the early disconnect warning level. At an insertion speed of 10 inches/second, this allows a little less than 3 milliseconds between each level of contact. A minimum electrical over-travel of 2.2 mm is provided for the shortest pin (5 mm) and the electrical overtravel goes up from there to a maximum of 5.2 mm on the 8 mm pin. After complete insertion, current draw for the I/O module 50 is less than 2 amps at 5 volts, 0.5 amps at 12 volts, and 0.25 amps at −12 volts.

When the first level of contacts meet, pins D1–D6 on J2, the I/O module 50 capacitance of approximately 100 uF is shorted across the power supply through the first soft start precharge circuit for +5 volts. The circuit interface of I/O module 50, including passive soft start circuitry, is shown in FIG. 6. Inputs J1, J2 and J3 in FIG. 6 correspond to connector pins J1, J2 and J3 in FIG. 5*a*–*c*. Three pins are used for each square on J2. The +5 volts first soft start circuit consists of inductor 71 which is approximately 10 μH and diode 72 which may be a shottky diode in series with the +5 power supply 84. The soft +5 trace 41 runs separate from the normal power and ground planes 45–48 all the way back to the power supply 38 as seen in FIG. 3. This trace is run as far back towards the connector between the power supply and backplane as possible to decouple the soft +5 trace 41 from normal power distribution. The soft ground trace 44 is treated similarly. When the first soft +5 contact is made, a peak surge current of 8 amps flows. By the time the second level of contact is made, I/O module 50's +5 volt power supply 84 is near steady state. With a DC current draw of 2 amps at +5 volts, the I/O module voltage will be at approximately 4.1 volts at steady state.

The second level of contact, pins C4–C6 and B1–B3 on J2, uses inductors 73*a* and 73*b* which may be ten uH in with the soft +5 trace 41 and soft ground 44. This reduces the resistance in the +5 power supply 38 and brings the +5 volt power supply 84 to approximately 4.8 volts steady state at 2 amp current draw. A peak surge current of four amps occurs.

Also on the second level of contact, pins C1–C3 and B4–B6 on J2, soft +12 and soft −12 is applied. I/O module 50's capacitance for +12 and −12 power supply is reduced to around 50 uF along with a DC current draw. Inductors 74 and 75 limit the current draw for the +12 and −12 voltage power supply on soft +12 and soft −12 traces 42 and 43, respectively. The traces are treated similarly to the soft +5 trace 41 in that they are independent for each I/O module and run back as close to the power supply as possible before connecting to the normal power and ground planes. This strategy gives peak current of less than eight amps. Fuse F1 is a slow blow fuse requiring 50 microseconds to blow. Typical peak current at fuse F1 is expected to last less than 10 microseconds. The steady state is reached with approximately 11.75 volts and −11.85 volts on +12 power supply 90 and −12 power supply 89, respectively.

On the third level of contact, pins A6–A7 on J1, A1–A6 on J2 and A6–A7 on J3, allow +5, +12, and −12 volts and ground applied to power supply 84, 90 and 89, respectively. The current is limited by the backplane trace resistance and connector resistances, approximately 0.05 ohms, and by trace inductance of about 40 mil. Current flows for a very brief period of time, approximately 10 microseconds, with a peak curr,grit of approximately 10, 15 and 7.5 amps for 5, 12 and −12 volt power supply, respectively.

The passive circuit components which contribute to the limiting of the current one located in I/O module 50. This design allows one of ordinary skill in the art to tailor the soft start circuit components to the amount of power required by an I/O module. In most cases, the use of a few inexpensive resistors and inductors will suffice but for higher power modules the designer may use an active FET circuit to soft start the board. Accordingly, the component values suggested above are approximations and may be adjusted for a particular design. For example, a larger value inductor can be used to reduce peak current, however at an additional cost.

By using a plurality of soft power traces to decouple the I/O module from the primary power traces and planes, the capacitances of power supply 38 allows for minimizing power drains to other I/O modules connected to the primary power traces and planes. For example, power supply 38 has 6600 uF at +5 volts, greater than 30 times the capacitance of inserted I/O module 50; 4400 uF at +12 volts, greater than 80 times the capacitance of inserted I/O module 50, and 500 uF at −12 volts, 10 times the capacitance of inserted I/O module 50. Thus, the output voltage on power supply 38 should not change substantially. The supply voltage as seen by other I/O modules which are held up by their supply capacitors should change even less.

The fourth level of contact, non-power pins, carry bus signals. Because the bus is in active operation during insertion, and other I/O modules are communicating at high frequency, the capacitance associated with signal traces and connections can cause a glitch. Means for substantially reducing the disruption of the bus signals include the following: Firstly, the inserted I/O module 50 has signal lines which are precharged to 2.5 volts, to reduce the difference between the signal voltage on the bus and the signal voltage on the inserted I/O module 50. A partial representation of the charging of the bus address/data lines BADX is shown in FIG. 7. For example, BAD0 through BAD3 are shown connected to ASIC 53. The first address/data line is connected to D1 on connector J1, the second address/data line is connected to pin C1 on connector J1, and so on. The interface between ASIC 53 and the remaining I/O module is on internal bus lines 87 labeled individually as PBADX. Resistors 85 and 80 which are 220K ohms are connected to power supply 84 through resistor 86 which is 4.7K ohms. Resistors 85 and 80 are connected to shared open collector lines (not shown). The 5 volt power supply 84 is used to precharge the lines. Resistors 86 and 88 act as a voltage divider to the +5 volt power supply 84 in order to apply approximately 2.5 volts on bus address/data lines BADX. Resistor 81 which is 220K is used to couple the 2.5 volt precharge voltage source to the signal lines while not allowing the 2.5 volt precharge to disrupt normal signal operation on address/data lines BADX. Resistor 93 is 39 ohms and used for series termination. This value is used to reduce ringing. Secondly, the backplane is fabricated to a lower impedance than I/O module 50. This reduces the magnitude of the initial step placed on the bus. The presence of a series termination resistor also may serve the same function; as its value is increased the step decreases. Finally, a capacitor may be added to the bus adjacent to the I/O module to be inserted in order to reduce the magnitude of the glitch in a worst case configuration of module insertion described below. Using the above means, the magnitude of the glitch as seen by an adjacent I/O module should be less than 300 mV worst case with a peak pulse of approximately 1 nSec, and ringing continuing for another 2 nSec.

In order to prevent this glitch from affecting operation, it is necessary that the noise margin be large enough to accommodate this glitch as well as ordinary noise. Generally, 500 mV is allowed for ordinary noise for a bus with a minimum high voltage signal of 3.5 volts; therefore, the bus signal should be at or above 4.3 volts before the earliest sample point. This requires that a bus signal reach 4.3 volts within 20.4 nsec. Thus, the present invention allows for a device to be inserted into a live bus and the bus is able to transfer information within a single bus cycle. While the bus is able to transfer information after a single bus cycle, it may take several cycles before the add-on device is able to receive or send information.

The fifth level of contact plays no role in insertion, pins D6 and D7 on J3. However, the pins connect to a parallel port of function processor 15 by way of line 21 from bus 12. The early disconnect warning will be weakly pulled up at the core memory controller 13 to a high; voltage level and strongly pulled down at the I/O module to a low level as shown at location 78. As I/O module 50 is removed, the core memory controller 13 will see this signal float high and realize that the I/O module 50 is being removed. The core memory controller 13 will then shut down communications with the I/O module.

Diodes 72, 76 and 77 which may be shottky diodes are inserted across the various power supplies on the modules in order to maintain unconnected supplies on I/O module 50 at reasonable levels relative to the connected supplies. For example, if +5 and ground are connected, −12 will float between Gnd and +5 because of parasitic resistances. Thus, −12 is higher than ground which is undesirable because it may back bias components. Putting a diode into the circuit prevents −12 from rising above ground and maintains relative voltages.

Figure 8:
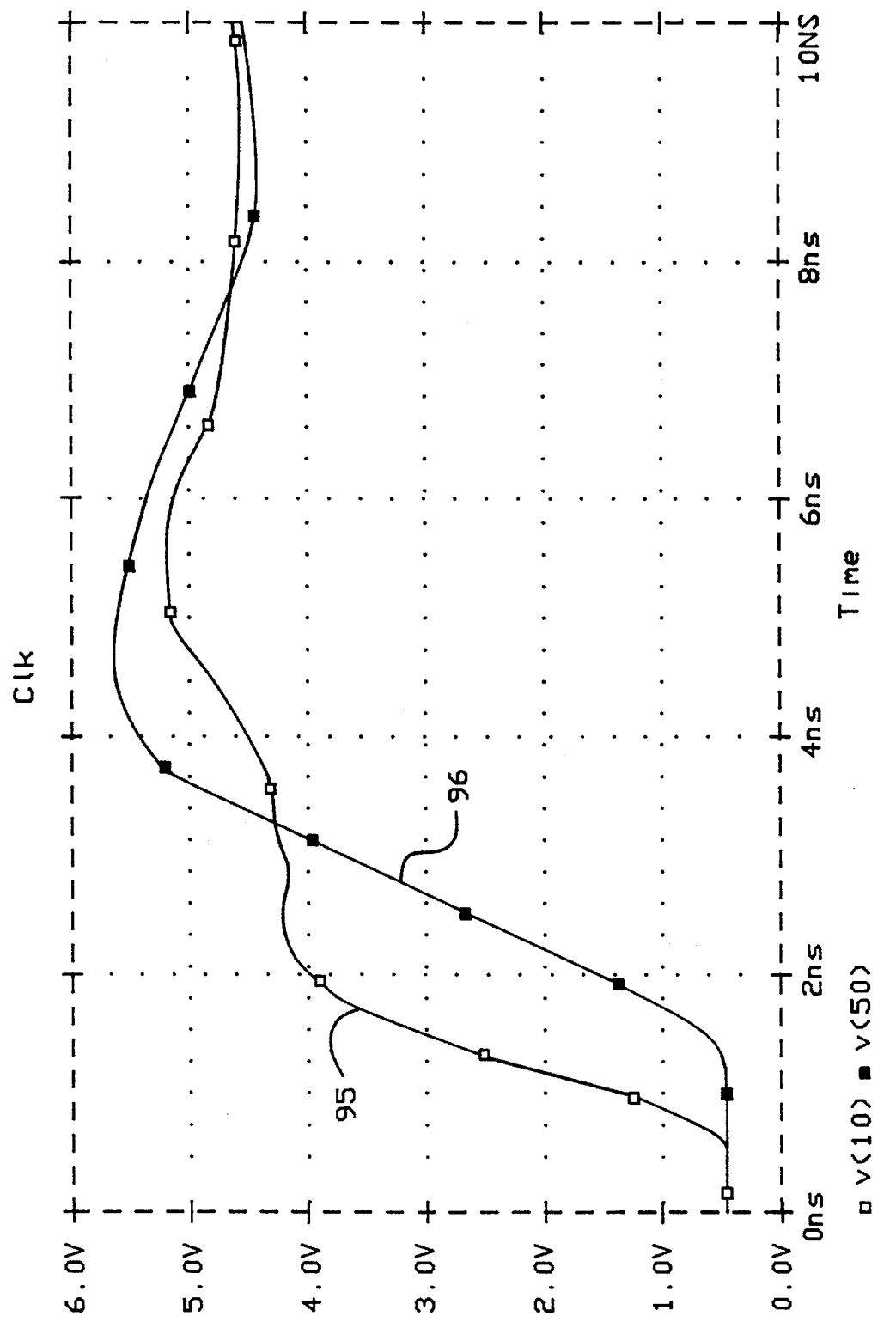
FIG. 8 is a best and worst case theoretical timing diagram of a bus clock signal according to the present invention.

FIG. 8 represents a theoretical worst/best case timing diagram of a clock signal according to the present invention. FIG. 8, as well as FIGS. 9 and 10, represent theoretical curves. Actual values are expected to be within a 10% tolerance. Backplane induced clock skew is calculated by subtracting the difference between worst case transition time to 3.5 volts and best case transition time to 1.5 volts. Best case conditions for the clock signal are when the I/O module is close proximity to the clock source. Worst case conditions are when the I/O modules have maximum distance to the clock source in a fully loaded backplane. The clock signal is distributed from a CPU card or core memory controller 13 at the top of the backplane 30. Two clock signals run out of the central clock source on the CPU card. Both are driven from a single low skew clock driver. Both use two outputs wired in parallel to achieve an output impedance of about 10 ohms or less. This allows the clock to comfortably exceed CMOS input threshold on the first step with a 60 ohm backplane. One of the clock signals coming out of the CPU card connects to a trace in the right hand column of connectors 30-5 through 30-8. The other connects to a trace in the left hand column of connectors 30-1 through 30-4. The clock signal in the left hand column runs back into the CPU card, and is used as the core bus clock by the CPU card's core bus interface ASIC. Special consideration should be given in routing this signal to ensure matched delay paths between both columns of cards. Both clock traces are terminated at the far end of the line with a thevinin resistive termination of 60 ohms. FIG. 8 shows a theoretical fastest and slowest clock signal shown as curve 95 and 96, respectively. The maximum skew is noted as 2 nsec. Clock signals are terminated on the I/O modules with a 39 ohm series resistor.

Figure 9A:
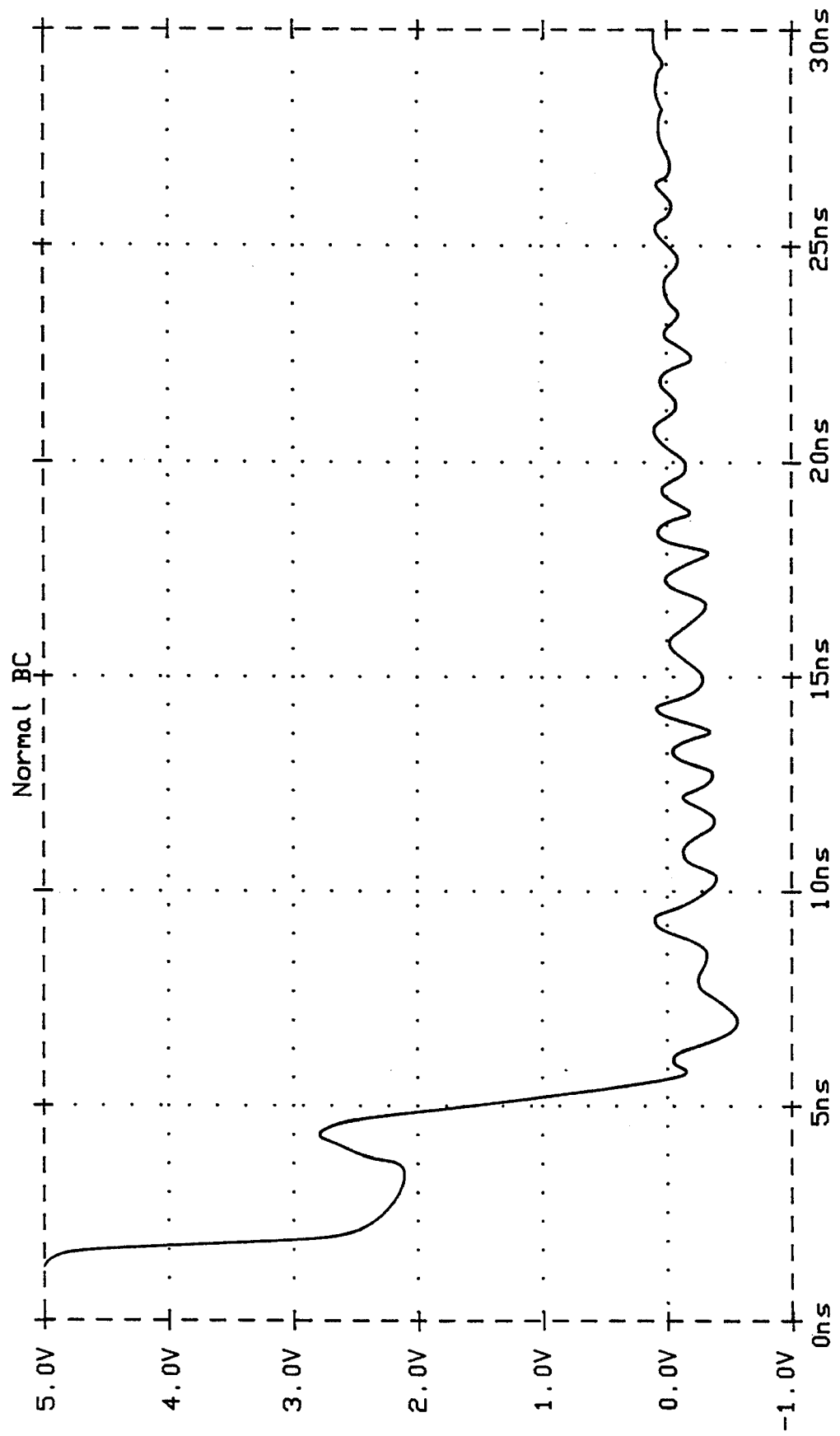
FIGS. 9a–b are best and worst case theoretical timing diagram of a normal bus signal according to the present invention.
Figure 9B:
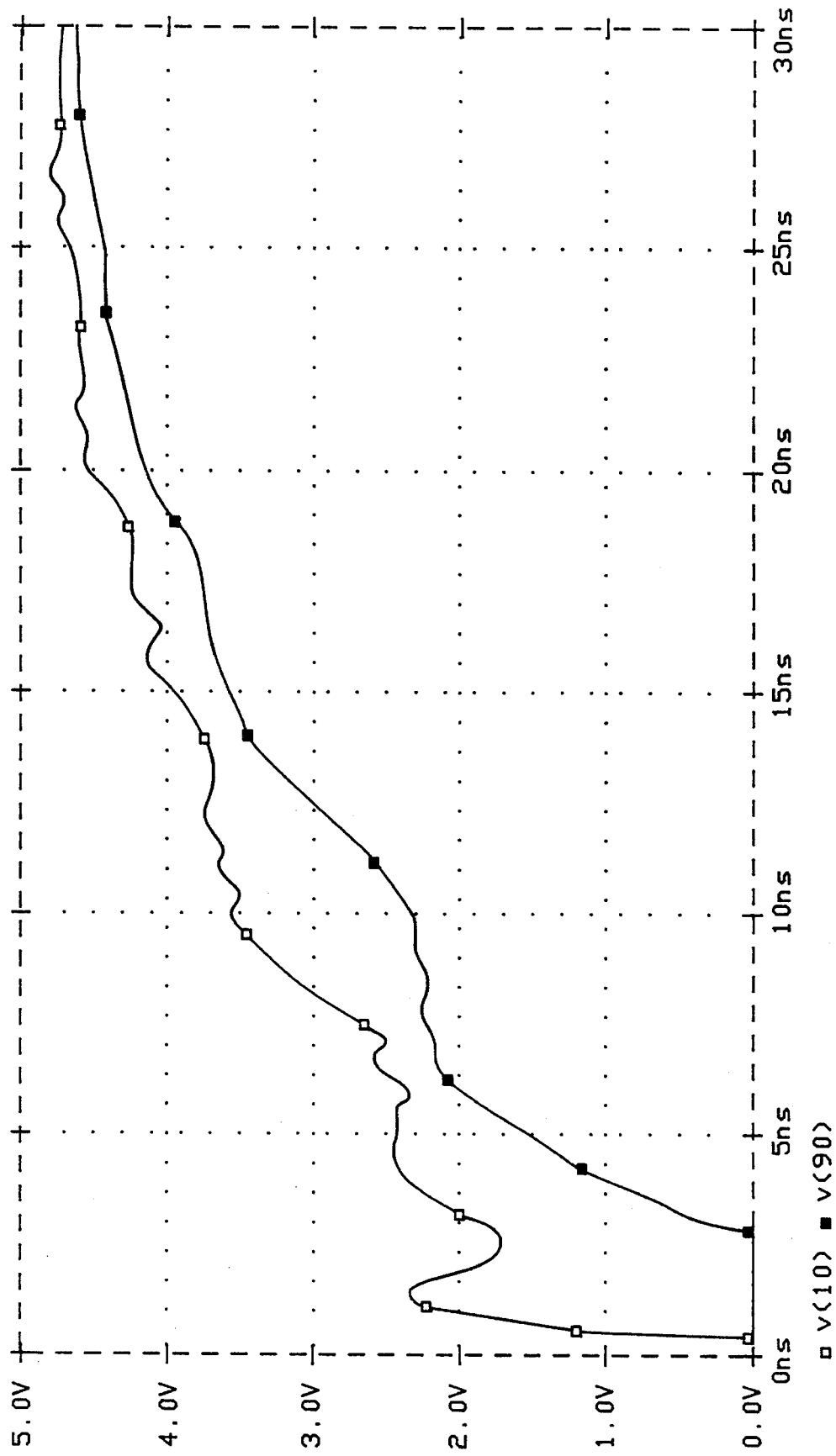

FIGS. 9a–b represent a theoretical best/worst case timing diagram of a normal bus signal on the bus. Normal signals are unterminated on backplane 30 but have series termination resistors of 39 ohms on the I/O modules and CPU. The best case for a normal signal is a best case LSI logic BD6 output buffer driving a bus with only two cards when the receiving card is adjacent to the driving card. The worst case for a normal bus signal is cards on opposite ends of a fully loaded bus in which the driving card has a worst case output buffer. The normal bus lines will have pullups internal to the ASIC's which are very high impedance on the order of a mega ohm. All normal signal lines on the bus have 4.7K ohm pullups to ensure that they will float to +5 volts within three clocks. This feature is essential when no network interface device is responding at a selected address. The status signals are weakly pulled up during the three clocks between the address and first data phase. The worst case, FIG. 9b, shows that the bus reaches 4.2 volts (well within the 10% tolerance limit of the theoretical curve and the 4.3 volts required) at 20.5 nsec which is the earliest possible sample point. The best case, FIG. 9a, shows that the bus exceeds CMOS input high thresholds at about 1.7 nsec.

Figure 10A:
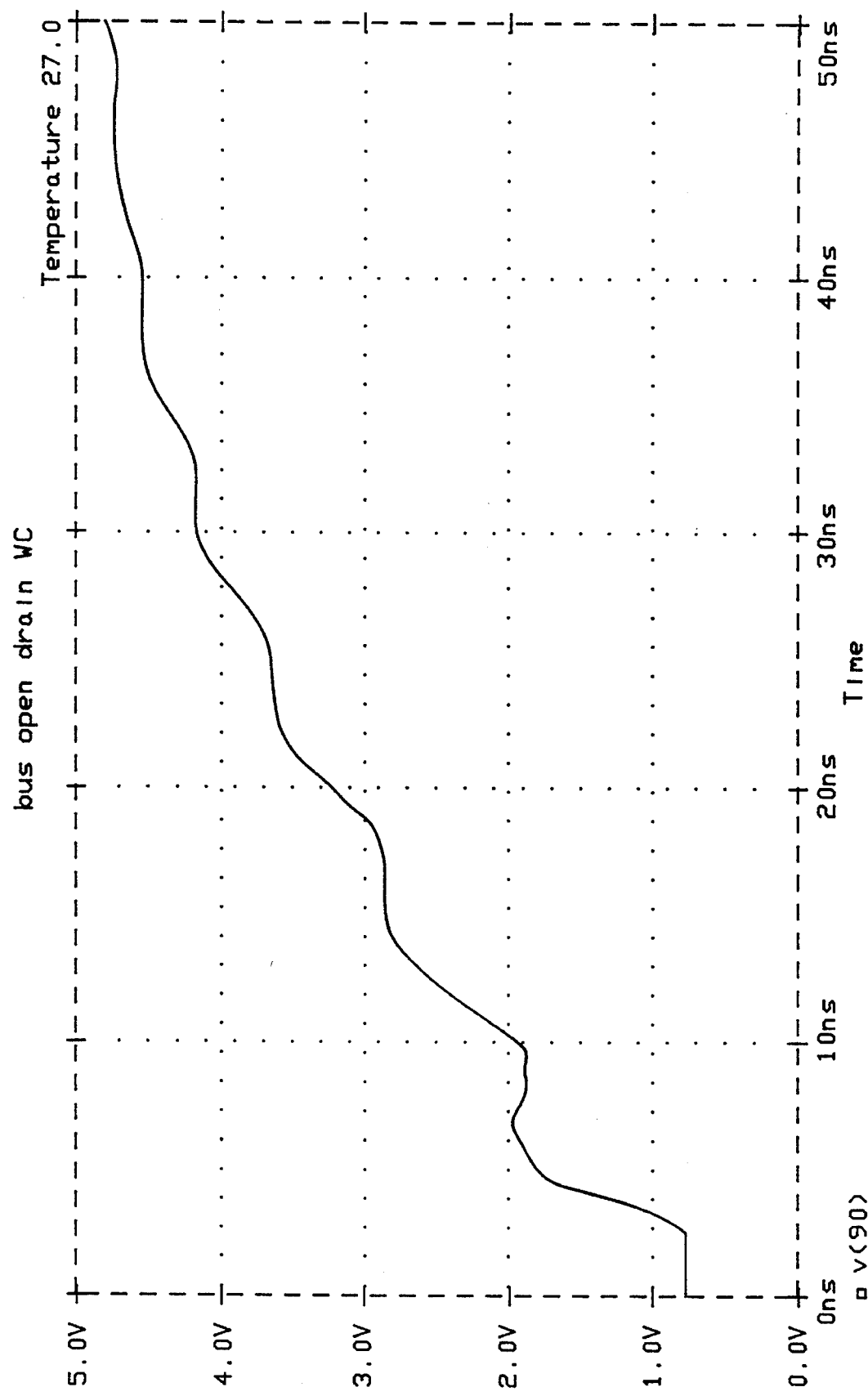
FIGS. 10a–c are best and worst case theoretical timing diagram of an open drain signal according to the present invention.
Figure 10B:
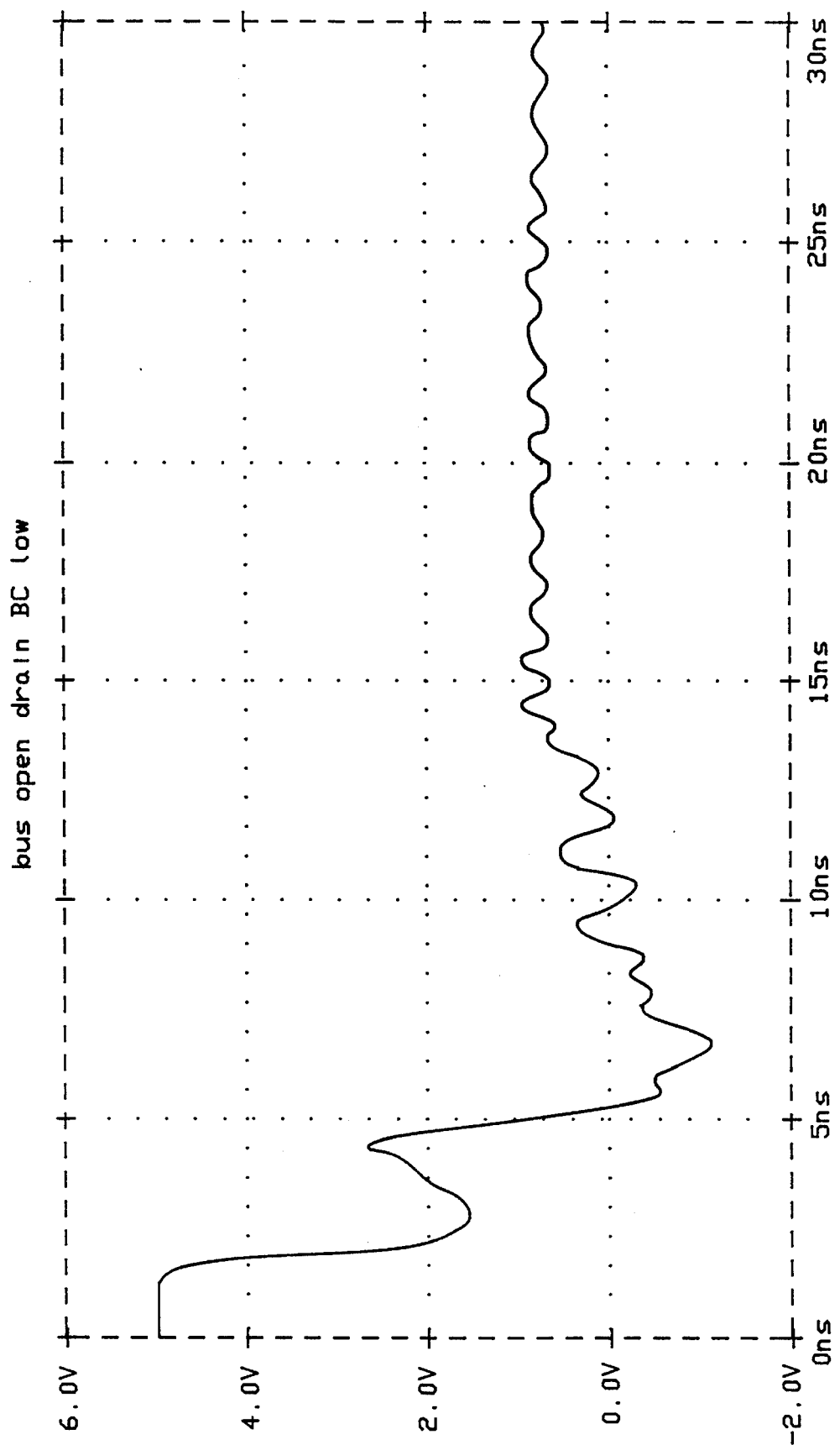
Figure 10C:
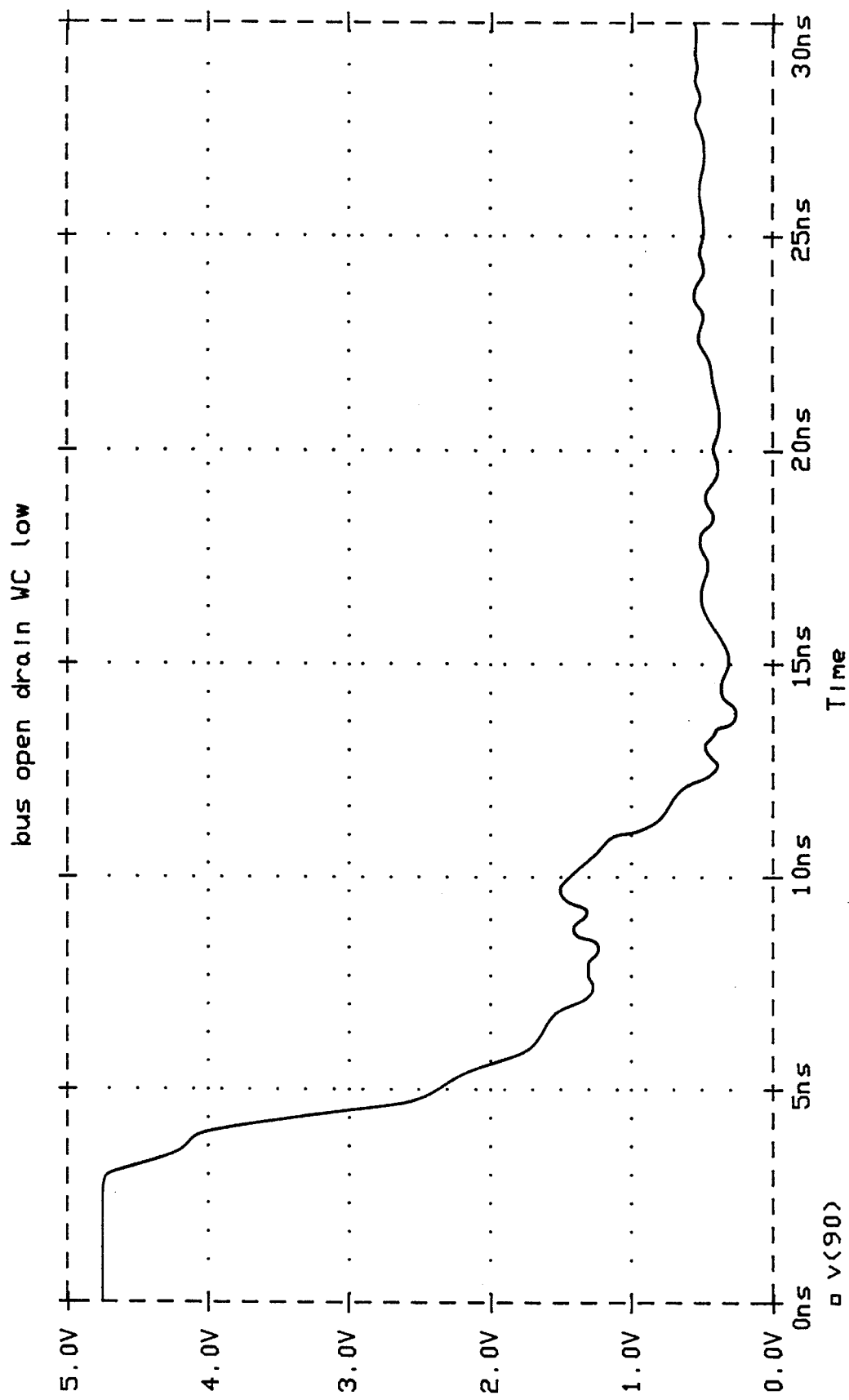

FIGS. 10a–c represent a theoretical worst/best case timing diagrams of the open drain signal on the bus. The BREQ and BUSY signals are shared by all I/O modules on backplane 30. They are pulled up lay a resistor and inductor in series, connected to 5 volts. The value of the inductor is 3.3 uH, and the resistor is 300 ohms. The signals are series terminated on each I/O module with a 27 ohm resistor. FIG. 10a shows that the pullup will be able to pull the signal up to 4.5 volts within one and a half clock cycles. FIG. 10b shows the best case of pulling down the open drain signal. In contrast, FIG. 10c shows the worst case of pulling the signal to 0.5 volts within one clock cycle. The best case times for open drain signals are similar to those for normal signals, while the worst case times are significantly better. This signal attains appropriate logic levels about 5 nsec earlier than normal signals.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for distributing power to devices in a plurality of bus slots on a common bus, wherein the bus includes a plurality of signal lines and the devices have power conductors, comprising:

a power supply having a capacitance generating at least one supply voltage;

a primary power line coupled to the power supply for supplying power to the at least two devices;

a plurality of secondary power lines for supplying power to the at least two devices, the secondary power lines being coupled to the power supply through attachment to the primary power line such that any current fluctuation on the bus caused by the connection of a device to the secondary power line is substantially absorbed by the capacitance of the power supply;

a plurality of connectors at each of a plurality of bus slots for connecting a device to a bus slot, the plurality of connectors including a primary power line connector connected to the primary power line for connecting the device to the primary power line, and a secondary power line connector including an inductive element connected to one of the secondary power lines for connecting the device to one of the secondary power lines, the secondary power line connector engaging the device when the device is being connected to the bus slot such that the secondary power line precharges the device prior to the device engaging the primary power line connector and becoming connected to the primary power line;

precharge circuitry, coupled with the connectors, to precharge nodes to be connected to signal lines on the bus for a device being inserted in a bus slot before such nodes are engaged with the bus; and wherein the secondary power line connector is connected to the power conductor on the device being inserted to prevent transient current surges from the secondary power line during insertion of the device.

2. The apparatus of claim 1, wherein the bus includes a plurality of signal lines, and including:

circuitry, coupled with the plurality of connectors, to precharge nodes to be connected to signal lines on the bus for a device being inserted in a bus slot before such nodes are engaged with the bus.

3. The apparatus of claim 2, wherein the signal lines on the bus have an operating voltage range, and the circuitry to precharge nodes precharges said nodes to a voltage in a middle range within the operating voltage range.

4. The apparatus of claim 1 including:

a device removal warning line which signals removal of a device from a bus slot; and wherein the plurality of connectors include an early warning connector coupled to the device removal warning line, which signals disconnection of a device before power is disengaged as the device is removed from the bus slot.

5. The apparatus of claim 4, wherein the early warning connector disengages from a device being inserted before the other connectors in the plurality of connectors.

6. The apparatus of claim 5, wherein the primary power line connector is a pin, and the secondary power line connector is a pin having a length longer than the primary power line pin so that when the device is being connected to the bus slot, the secondary power line pin engages the device prior to the device engaging the primary power line pin.

7. The apparatus of claim 1 wherein the secondary power lines are attached to the primary power line such that the voltage provided to devices on the bus remains substantially constant as a device is connected to a secondary power line.

8. The apparatus of claim 1 wherein the secondary power lines are attached to the primary power line such that the capacitance along the primary power line between the point of connection of the secondary power line to the power supply exceeds the capacitance along the primary power line between the point of connection of the secondary power line to any device connected to the bus.

9. An apparatus for connecting at least two devices to a power supply on a common bus comprising:

a power supply having a capacitance generating at least one supply voltage;

a primary power line coupled to the power supply for supplying power to the at least two devices;

a plurality of secondary power lines for supplying power to the at least two devices, the secondary power lines being coupled to the power supply through attachment to the primary power line such that any current fluctuation on the bus caused by the connection of a device to the secondary power line is substantially absorbed by the capacitance of the power supply;

a plurality of connectors at each of a plurality of bus slots for connecting a device to a bus slot, the plurality of connectors including a primary power line connector connected to the primary power line for connecting the device to the primary power line, and a secondary power line connector connected to one of the secondary power lines for connecting the device to one of the secondary power lines, the secondary power line connector engaging the device when the device is being connected to the bus slot such that the secondary power line precharges the device prior to the device engaging the primary power line connector and becoming connected to the primary power line.

10. The apparatus of claim 9, wherein the bus includes a plurality of signal lines, and including:

circuitry, coupled with the plurality of connectors, to precharge nodes to be connected to signal lines on the bus for a device being inserted in a bus slot before such nodes are engaged with the bus.

11. The apparatus of claim 10, wherein the signal lines on the bus have an operating voltage range, and the circuitry to precharge nodes precharges said nodes to a voltage in a middle range within the operating voltage range.

12. The apparatus of claim 10 wherein the plurality of connectors further includes a signal line connector connected to the signal lines for connecting the device to the signal lines.

13. The apparatus of claim 12 wherein the primary power line connector is a pin, the secondary power line connector is a pin having a length longer than the primary power line pin so that when the device is being connected to the bus slot, the secondary power line pin engages the device prior to the device engaging the primary power line pin, and the signal line connector is a pin having a length shorter than the primary power line pin so that when the device is being connected to the bus slot, the primary power line pin engages the device prior to the device engaging the signal line pin.

14. The apparatus of claim 9, wherein the secondary power line connector includes an inductive element which attaches to a power conductor on a device being inserted to prevent transient current surges from the secondary power line during insertion of the device.

15. The apparatus of claim 9, including:

a device removal warning line which signals removal of a device from a bus slot; and wherein the plurality of connectors include an early warning connector coupled to the device removal warning line, which signals disconnection of a device before power is disengaged as the device is removed from the bus slot.

16. The apparatus of claim 15, wherein the early warning connector disengages from a device being removed from a bus slot before the other connectors of the plurality of connectors.

17. The apparatus of claim 9 wherein the secondary power lines are attached to the primary power line such that the voltage provided to devices on the bus remains substantially constant as a device is connected to a secondary power line.

18. The apparatus of claim 9 wherein the secondary power lines are attached to the primary power line such that the capacitance along the primary power line between the point of connection of the secondary power line to the power supply exceeds the capacitance along the primary power line between the point of connection of the secondary power line to any device connected to the bus.

19. The apparatus of claim 9 wherein
the primary power line connector is a pin, and
the secondary power line connector is a pin having a length longer than the primary power line pin so that when the device is being connected to the bus slot the secondary power line pin engages the device prior to the device engaging the primary power line pin.

20. An apparatus for connecting at least two devices to a power supply on a common bus which includes a plurality of signal lines comprising:
a power supply having a capacitance generating at least one supply voltage;
a primary power line coupled to the power supply for supplying power to the at least two devices;
a plurality of secondary power lines for supplying power to the at least two devices, the secondary power lines being coupled to the power supply through attachment to the primary power line such that any current fluctuation on the bus caused by the connection of a device to the secondary power line is substantially absorbed by the capacitance of the power supply;
a plurality of connectors at each of a plurality of bus slots for connecting a device to a bus slot, the plurality of connectors including
a primary power line connector connected to the primary power line for connecting the device to the primary power line, and
a secondary power line connector connected to one of the secondary power lines for connecting the device to one of the secondary power lines, the secondary power line connector engaging the device when the device is being connected to the bus slot such that the secondary power line precharges the device prior to the device engaging the primary power line connector and becoming connected to the primary power line;
and precharge circuitry, coupled with the connectors, to precharge nodes to be connected to signal lines on the bus for a device being inserted in a bus slot before such nodes are engaged with the bus.

21. The apparatus of claim 20, wherein the signal lines on the bus have an operating voltage range, and the precharge circuitry precharges said nodes to a voltage in a middle range within the operating voltage range.

22. The apparatus of claim 20, wherein the secondary power line connector includes an inductive element which attaches to a power conductor on a device being inserted to prevent transient current surges from the secondary power line during insertion of the device.

23. The apparatus of claim 20, including:
a device removal warning line which signals removal of a device from a bus slot; and wherein
the plurality of connectors include an early warning connector coupled to the device removal warning line, which signals disconnection of a device before power is disengaged as the device is removed from the bus slot.

24. The apparatus of claim 23, wherein the early warning connector disengages from a device being removed from a bus slot before the other connectors in the plurality of connectors.

25. The apparatus of claim 20 wherein the secondary power lines are attached to the primary power line such that the voltage provided to devices on the bus remains substantially constant as a device is connected to a secondary power line.

26. The apparatus of claim 20 wherein the secondary power lines are attached to the primary power line such that the capacitance along the primary power line between the point of connection of the secondary power line to the power supply exceeds the capacitance along the primary power line between the point of connection of the secondary power line to any device connected to the bus.

27. The apparatus of claim 20 wherein
the primary power line connector is a pin, and
the secondary power line connector is a pin having a length longer than the primary power line pin so that when the device is being connected to the bus slot, the secondary power line pin engages the device prior to the device engaging the primary power line pin.

* * * * *